T. ZIMMERMAN.
AXLE CONSTRUCTION.
APPLICATION FILED JAN. 16, 1919.
1,369,210. Patented Feb. 22, 1921.
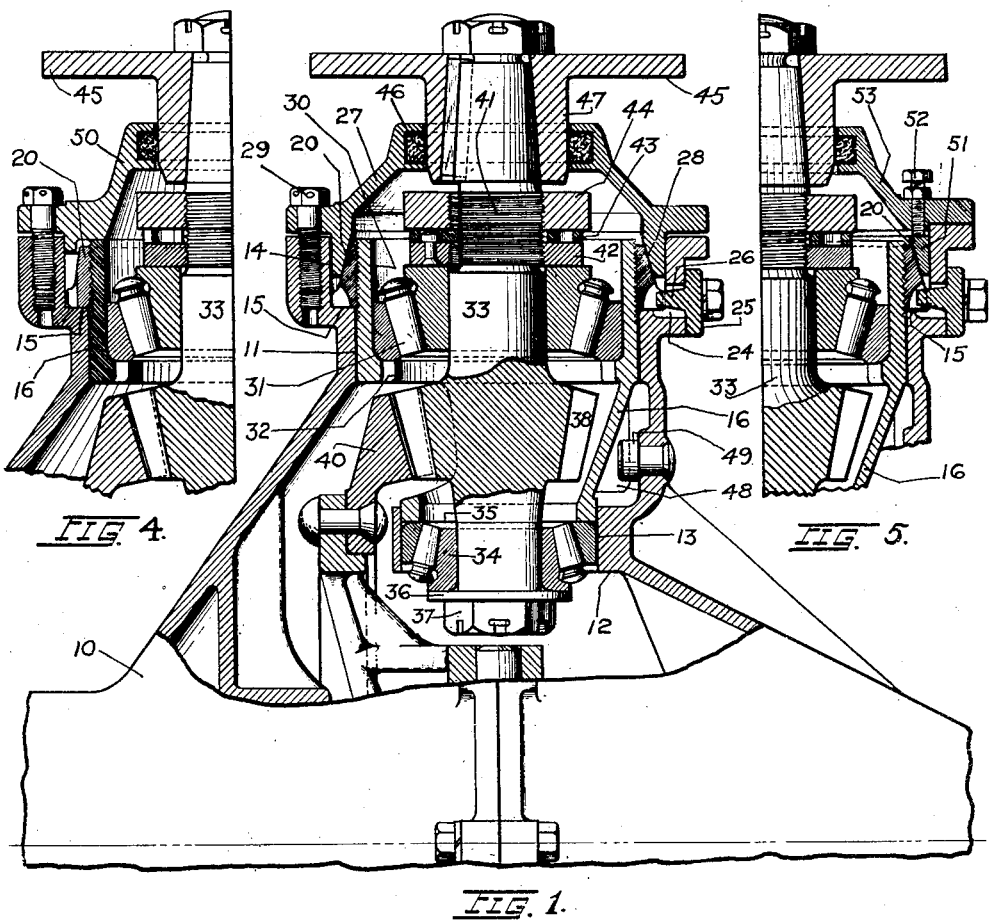
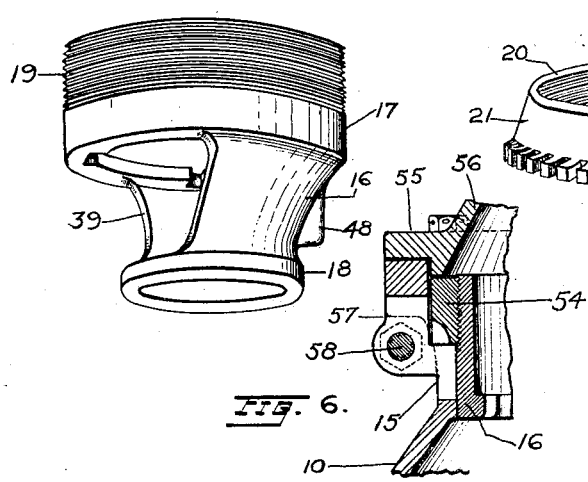

UNITED STATES PATENT OFFICE.

THOMAS ZIMMERMAN, OF CLEVELAND, OHIO, ASSIGNOR TO THE STANDARD PARTS COMPANY, OF CLEVELAND, OHIO, A CORPORATION OF OHIO.

AXLE CONSTRUCTION.

1,369,210.   Specification of Letters Patent.   Patented Feb. 22, 1921.

Application filed January 16, 1919. Serial No. 271,430.

*To all whom it may concern:*

Be it known that I, THOMAS ZIMMERMAN, a citizen of the United States, and a resident of Cleveland, county of Cuyahoga, State of Ohio, have invented certain new and useful Improvements in Axle Construction, of which the following is a specification.

This invention relates to driving axles for motor vehicles and more particularly to the pinion shaft mounting.

It is one of the objects of the invention to provide a form of mounting that will permit the adjustment of the pinion relative to the gear with which it meshes, without disturbing the bearings of the pinion shaft, and to also provide a construction in which the pinion shaft and its bearings will be contained in a cage, with which the parts may be assembled and properly adjusted, when removed from the axle housing.

Other objects of the invention and the features of novelty will be apparent from the following description taken in connection with the accompanying drawings, of which:

Figure 1 is a plan view of a portion of an axle housing, with parts shown in section on the plane of the axis of the pinion shaft.

Fig. 2 is a perspective view of the cage in which the pinion shaft is mounted.

Fig. 3 is a perspective view of the ring nut for adjusting the cage.

Fig. 4 is a fragmentary view, similar to Fig. 1, but showing a modification.

Fig. 5 is a fragmentary view, similar to Fig. 1, but showing another modification, and Fig. 6 is a similar fragmentary view of still another modification.

Referring to the drawings, 10 indicates an extension on the axle housing to receive the pinion shaft and its mounting and this extension is provided with a cylindrical bore, or opening, 11 and an interior bracket 12, provided with a bore 13, which alines with the bore 11. The housing extension 10 is also counterposed at 14 to form a shoulder, or abutment, 15 adjacent the bore 11. A cage 16 has cylindrical surfaces 17 and 18, which fit the bores 11 and 13, respectively, and, as will be seen from Fig. 1, the cage 16 may be adjusted axially in these bores.

In all of the preferred forms of the invention which are illustrated in the drawings, the cage 16 is provided with external screw threads 19 in its large end, and in the form illustrated in Fig. 1, a ring nut 20 engages the threads 19 and has a conical surface 21 and a split 22, whereby it may be clamped on the cage 16. The ring nut 20 has its inner end arranged to coöperate with the shoulder 15 and is also provided with a series of peripheral teeth 23. On one side, the extension 10 has an opening 24, which is normally closed by a cover 25, having a finger 26 projecting from the inner side thereof into engagement with the teeth 23 for the purpose of holding the nut 20 against circumferential movement. The opening 24 also makes it possible, upon the removal of the cover 25, to insert a tool for the purpose of adjusting the nut 20.

A cover plate 27 closes the open end of the extension 10 and is preferably provided with an internal conical surface 28 adapted to coöperate with the conical surface 21 on the nut 20 so that when the cover plate 27 is drawn down into position, by means of its securing bolts 29, the ring nut 20 will be firmly clamped against the exterior of the cage 16 and also against the shoulder 15 on the housing extension, to thereby securely hold the cage 16 in any position to which it is adjusted. By splitting the ring nut 20 and clamping it on the cage 16, as above described, all play in the threads is taken up and there will be no working in the threads and the latter will be relieved, to a large extent, of the thrust to which the cage is subjected.

The cage 16 is provided with a bore 30 for a roller bearing 31, this bearing abutting a shoulder 32 on the cage and supporting the pinion shaft 33. The inner end of the pinion shaft 33 is carried by a bearing 34 which fits the bore 13 in the bracket 12 and has one end in engagement with the end surface 35 of the cage 16 and the other end in engagement with a collar, or shoulder, 36 that is secured on the pinion shaft by the nut 37.

The pinion shaft 33 carries a pinion 38, which projects through the opening 39 in the cage 16 and meshes with the usual differential-gear 40, the latter being adjustable in the direction of its own axis by any of the well-known means employed for this purpose.

The pinion shaft 33 is threaded exteriorly of the bearing 31, as indicated at 41, and a nut 42 is arranged on the threaded portion 41 for the purpose of adjusting the bearings 31 and 34.

From Fig. 1, it will be evident that movement of the nut 42 toward the pinion 38 will draw the shaft 33 outwardly and secure the bearing 34 against the end 35 of the cage 16 and against the shoulder 36, the bearing 31 being simultaneously secured between the nut 42 and the shoulder 32. The usual lock-washer 43 and lock-nut 44 are provided for locking the nut 42. On the outer end of the pinion shaft 33 a flange 45, or other device, may be employed for the purpose of connecting the pinion shaft 33 with the propeller shaft of the vehicle and, in order to prevent leakage of lubricant, suitable packing 46 may be provided in the cover plate 27 around the hub 47 of the flange 45.

Spaced external ears 48 are provided on the exterior of the cage 16 to receive between them the head 49 of a stud which is secured in the housing, the purpose of this feature being to hold the cage 16 against rotation in the housing, although not interfering with axial movement therein.

The cage 16 with the pinion shaft 33 and its bearings may be removed, as a unit, from the housing and proper adjustment of the bearings made on a bench or in any other convenient place. When the cage 16 is inserted in the housing, it may be properly located by means of the nut 20, which may be rotated, as above described, by tool inserted through the opening 24. When the nut 20 is adjusted to properly locate the pinion 38, the cover 27 is placed in position and drawn down by means of the bolts 29, which, through the medium of the conical surface 28, clamp the nut 20 on the threaded portion 19 of the cage 16 and also against the shoulder 15 and thus securely lock the cage 16 in position. Lubrication for the parts will be received from the interior of the axle housing and the bearing 31 will be supplied by lubricant which passes through the opening 39 into the cage 16.

In the form of the invention shown in Fig. 4, the cover plate 50 bears directly on the outer end of the cage 16 without clamping the nut 20 on the exterior threads of the cage 16. By this construction, the inner end of the nut 20 is clamped against the shoulder 15, but I prefer the construction shown in Fig. 1, for the reason that the nut 20 is securely clamped on the exterior of the cage 16 and there is no possibility for the parts working in the threads. The features of construction may be otherwise similar to Fig. 1.

In the form of the invention shown in Fig. 5, a ring 51, having a conical inner surface, engages the exterior of the ring nut 20 and adjusting bolts 52 carried by the cover 53 engage with the ring 51, at a plurality of points in its circumference, and not only clamp the ring against the nut 20 but also serve to clamp the latter against the exterior of the cage 16 and against the shoulder 15.

In the construction shown in Fig. 6, the ring nut 54 engages the shoulder 15 on the housing, but is not clamped against this shoulder or against the exterior of the cage 16, serving merely as a means for moving the cage 16 axially, the ring 54 being loosely held between the shoulder 15 and the abutment 55 on the cover plate 56. In this form of the invention, the housing 10 is split, as indicated at 57 and clamped on the cage 16 by means of the ordinary clamping bolt 58.

While I have illustrated and described what I now consider to be the preferred forms of my invention, it is understood that the principles of the invention are not limited to the details of construction which I have shown and described. Therefore, it is my desire to cover all constructions coming within the spirit of the invention, as defined in the appended claims.

Having thus described my invention, what I claim is:

1. In a driving axle, the combination of a housing having an opening for a pinion shaft, a cage for carrying said shaft and its bearings, a ring nut on said cage abutting a shoulder on said housing, and a cover for said opening adapted to clamp said nut against said shoulder and secure said cage against movement axially of the pinion shaft.

2. In a driving axle, the combination of a housing having an opening for a pinion shaft, a cage for carrying said shaft and its bearings, a split ring nut on said cage abutting a shoulder on said housing, a cover for said opening, and means on said cover for clamping said ring nut on said cage and against said shoulder to secure the cage against movement axially of the pinion shaft.

3. In a driving axle, the combination of a housing having an opening for a pinion shaft, a cage for carrying said shaft and its bearings, a split ring nut on said cage abutting a shoulder on said housing, and adjustable means on said housing for clamping said ring on said cage and against said shoulder to secure the cage against movement axially of the pinion shaft.

4. In a driving axle, the combination of a housing having an opening for a pinion shaft, a cage for carrying said shaft and its bearings, a split ring nut on said cage abutting a shoulder on said housing and provided with a conical outer surface, and a cover for said opening having a surface engaging said conical surface and adapted to clamp said ring nut on said cage and against said shoulder when secured in position on said housing.

5. In a driving axle, the combination of a housing having an extension for a pinion shaft, said extension having a cylindrical surface, a cage fitting said surface, a pinion shaft and bearings assembled as a unit with said cage, a ring nut having threaded connection with said cage and abutting a shoulder in said extension, a cover having a fit on said extension concentric to the axis of said pinion shaft and engaging said ring nut and clamping the latter against said shoulder to thereby hold said cage against movement axially of said pinion shaft.

6. In a driving axle, the combination of a housing having an extension for a pinion shaft, a cage fitting within said housing, a rotatable member for adjusting said cage in said housing, in a direction axial of the pinion shaft, means on said housing for holding said cage from turning, but permitting axial movement thereof, and a cover adapted to clamp said rotatable member so as to rigidly hold it and said cage.

7. In a driving axle, the combination of a housing having an extension for a pinion shaft, a cage within said extension, adjustable means for securing said cage, a bearing within said cage abutting a shoulder thereon, a pinion shaft supported by said bearing, a pinion thereon, a bearing for said shaft abutting a surface at the inner end of said cage, an abutment on said shaft inward of said pinion and coöperating with the latter bearing to hold it on said surface, and means at the outer side of the first-mentioned bearing adjustable on said shaft to adjust both of said bearings and secure them in such adjustment.

8. In a driving axle, the combination of a housing having an extension provided with two alined bores spaced apart axially of the pinion shaft, a cage fitting said bores, means for axially adjusting said cage, a bearing in the outer end of said cage, a bearing abutting the inner end of said cage and fitting the inner of said spaced bores, a pinion shaft carried by said bearings and having a shoulder engaging with the outer bearing to simultaneously adjust both bearings.

9. In a driving axle, the combination of a housing having an extension provided with two alined bores spaced apart axially of the pinion shaft, a cage fitting said bores, a rotatable member having threaded connection with said cage for adjusting the latter axially, means for preventing rotation of said cage while being adjusted axially, said extension having an opening through which said member may be adjusted, a cover for clamping said member and said cage in position, a bearing in the outer end of said cage, a bearing abutting the inner end of said cage and fitting the inner of spaced bores, a pinion shaft carried by said bearings and having a collar engaging with the inner bearing, and means on said shaft for simultaneously adjusting both bearings.

10. In a driving axle, the combination of a housing, a pinion cage therein, a pinion shaft, a bearing for said shaft in the outer end of said cage adjustable on the shaft and having its inner side abutting a shoulder on the cage, a pinion on said shaft, a bearing supporting said shaft inwardly of said pinion and held from axial movement relative to the cage by abutments on the cage and shaft, and means having threaded connection with said shaft on the outer side of the first-mentioned bearing for simultaneously adjusting both bearings.

11. In a driving axle, the combination of a housing, a pinion cage therein, a pinion shaft, a bearing for said shaft in the outer end of said cage adjustable on the shaft and having its inner side abutting a shoulder on the cage, a pinion on said shaft, a bearing supporting said shaft inwardly of said pinion and held from axial movement relative to the cage by abutments on the cage and shaft, and means having threaded connection with said shaft for simultaneously adjusting both bearings.

In testimony whereof I affix my signature.

THOMAS ZIMMERMAN.